United States Patent [19]

Fliegner et al.

[11] 3,757,350

[45] Sept. 4, 1973

[54] RECORDING DEVICE HAVING SUPPLEMENTARY INFORMATION SCRIBING MEANS

[75] Inventors: Manfred Fliegner, Stuttgart; Peter Liermann, Moglingen; Hans Bäuerlen, Gerlingen, all of Germany

[73] Assignee: Robert Bosch GmbH, Stuttgart, Germany

[22] Filed: June 12, 1972

[21] Appl. No.: 261,936

[30] Foreign Application Priority Data

June 11, 1971 Germany .................. P 21 28 861.9

[52] U.S. Cl. .................. 346/50, 346/76 R, 346/141

[51] Int. Cl. .......................................... G01d 9/28

[58] Field of Search .................. 346/50, 66, 35, 76, 346/141; 197/1 R

[56] References Cited

UNITED STATES PATENTS

| | | | |
|---|---|---|---|
| 912,181 | 2/1909 | Schattner | 346/76 R |
| 2,544,919 | 3/1951 | Dueringer | 346/35 |
| 2,673,136 | 3/1954 | Stein et al. | 346/33 R |
| 3,419,886 | 12/1968 | Ortlieb | 346/76 X |

*Primary Examiner*—Joseph W. Hartary
*Attorney*—Michael S. Striker

[57] ABSTRACT

A record carrier is moved in a first direction and a recording electrode records on the advancing carrier information which represents measurements taken. A scribing head is located laterally spaced from the recording electrode and is movable in the direction of advancement of the carrier, being operable for producing on the advancing area indicia providing information of supplementary character. A method of recording this information is also disclosed.

20 Claims, 4 Drawing Figures

RECORDING DEVICE HAVING SUPPLEMENTARY INFORMATION SCRIBING MEANS

BACKGROUND OF THE INVENTION

The present invention relates generally to the recording of information, and more particularly to the recording of information which is representative of measurements taken.

Devices are already known which record certain information and have an indicator which moves in response to the recording of such information. Such devices may be provided on their indicator with a recording electrode which engages a record carrier being moved underneath it in a predetermined direction and which, when electrically energized, will produce on this record carrier indicia —for instance in form of a track— which are representative of the measured information. It is known to provide the record carrier on a surface thereof with a thin film of metallic matieral, for instance vapor-deposited metal, into which the electrode burns a track as it moves with reference to the carrier which itself advances in the aforementioned predetermined direction.

It is widely customary to produce the surface of such a record carrier at the time the carrier is manufactured, with appropriate markings, for instance letters, numbers, longitudinal or transverse lines, or both longitudinal and transverse lines which may intersect one another and subdivide the surface analogous to graph paper. The purpose of these markings is to provide an indication of the measured values which have been recorded by the writing electrode, and to provide an indication of the time periods in which these values have been measured. This is, of course, already well known and is not believed to require any elaboration.

What must be pointed out, however, is the fact that in certain types of devices operating on this principle the interpretation of the recordings made on the record carrier is very difficult and, in fact, impossible to achieve with any degree of accuracy. For instance, if the device is of the type which supervises and records the occurrence of errors, disturbances or the like, then it is customary to construct such devices in such a manner that when an error or a disturbance occurs, the carrier is advanced at a substantially higher speed than when nothing is to be recorded, that is when no error or disturbance occurs. In such a case, however, the recorded information subsequently does not indicate with any significant degree of precision at what time and for what period of time the error or disturbance has taken place. Thus, a definite need exists in this field for further improvements.

SUMMARY OF THE INVENTION

Accordingly, it is an object of the present invention to provide such improvements.

More particularly it is an object of the present invention to provide a novel method of recording both main and supplementary information on a moving record carrier in such a manner as to overcome the disadvantages of the prior art.

Another object of the invention is to provide a device for carrying out the novel method.

A concomitant object is to provide such a device which permits the recording not only of the main items of information, that is for instance tracks or graphs, but secondary or supplementary items of information, for instance indicating the time, the date or the number of a particular occurrence, and while so doing assuring that the secondary items of information are associated with a particular location or item of main information.

Another object of the invention is to provide such an improved device in which the recording of the main and secondary items of information is reliably provided, as well as being readily interpretable and well legible, even in the event an increase in the speed of advancement of the recording carrier should take place.

In pursuance of these objects, and of others which will become apparent hereafter, one feature of the invention resides in a device for recording measured information which, briefly stated, comprises record carrier means having a surface adapted to have recordings produced thereon, and advancing means for advancing the record carrier means in a predetermined direction. Recording means is provided for recording on the surface of the advancing record carrier means information which is representative of measurements taken, that is main information. Finally, there is provided scribing means adjacent and movable relative to the advancing recording carrier means for scribing onto the surface of the latter indicia which are supplementary to the information, that is secondary items of information.

Advantageously the scribing means may utilize a scribing head which is normally in a rest position and can move from the same to a scribing position and from there back to its rest position. The displacement of the scribing head may be effected by means of an electromagnetic device which may be utilized for displacing the scribing head from its rest position to its scribing position, and a restoring device, for instance a restoring spring, may be provided for returning the scribing head to its rest position when the electromagnetic device is de-energized.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 2:
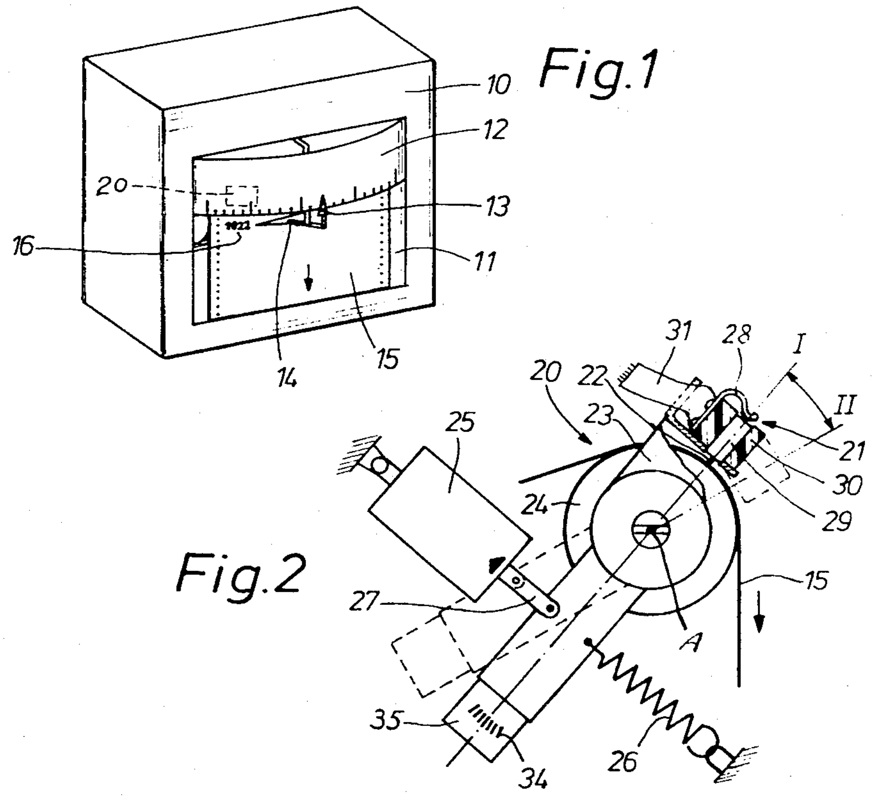
FIG. 1 is a perspective view illustrating a device embodying the present invention.
FIG. 2 is a fragmentary partly sectioned side view illustrating details of the device in FIG. 1.
Figure 3:
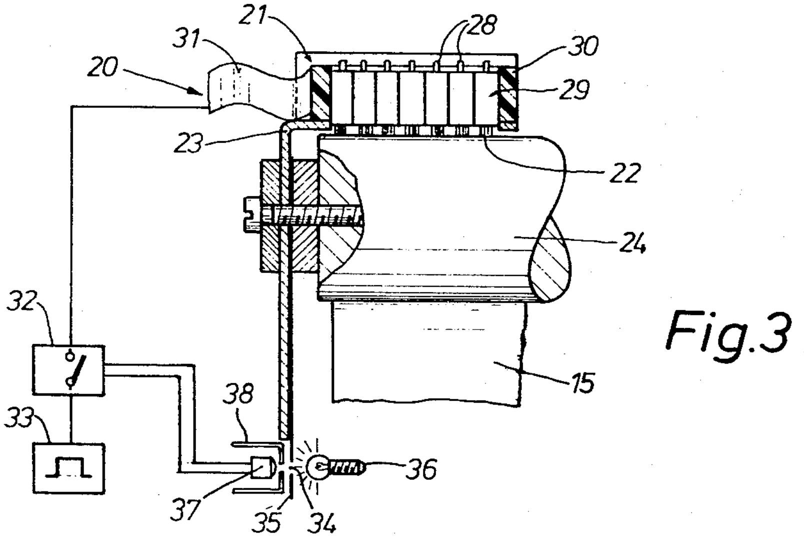
FIG. 3 is a further detail view of the device of FIGS. 1 and 2, as seen from one side in FIG. 2 and with certain parts omitted for the sake of clarity.

Discussing the drawing now in detail, and firstly FIGS. 1–3, it will be seen that the device per se is designated in FIG. 1 with reference numeral 10. Its housing is provided with a cutout or window 11 through which a dial 12 may be viewed. The housing further accommodates in its interior (hence not visible) a measuring instrument which may be of any of the various types known to those skilled in the art as long as it is of the type having a pointer 13 which moves with respect to the dial 12 when the device performs measurements. The particular character and construction of the measuring device itself is of no importance for purposes of the present invention.

Mounted on the pointer or indicator 13 is a recording or writing electrode 14, an expedient which in itself is already known from the art. A record carrier, for instance a strip of foil or the like carrying on its exposed surface a film of deposited metallic material, advances beneath the electrode 14 in the direction of the arrow (see FIGS. 1 and 2). Evidently, it could also advance in opposite direction.

When the electrode 13 is energized by having electrical energy supplied to it, it will burn portions of the metallic film off where it comes in contact with the same, leaving a clearly discernable track which is of course elongated inasmuch as the carrier 15 moves with reference to the electrode. Due to the movement of the pointer 13 and the electrode 14 back and forth transversely of the track 15, in response to various measurements taken by the non-illustrated measuring device, the main item or items of information will then be recorded in form of a track on the surface of the carrier 15.

According to the present invention the device 10 is further provided with a scribing means, utilizing a movable scribing head 20 which is diagrammatically illustrated in FIG. 1 and is laterally offset from the electrode 14, being located substantailly at the same transverse level of the same and being at least in its rest position concealed so as not to be visible. It is movable to a scribing position in which it scribes items of supplementary information on the surface of the advancing record carrier 15, and such items are scribed on the surface in such a position that they are clearly visible through the window 11, as indicated at 16 in FIG. 1 where for instance the time of 10.22 a.m. is indicated. The arrangement is of course such that if the pointer 13 performs a movement which exceeds a pre-selectable maximum, and which thus indicates for instance a disturbance in the value being measured, the scribing head is activated and then produces substantially on the same level on which the electrode 14 of the pointer 13 has recorded the disturbance or the like, a supplementary item of information, for instance the time as indicated at 16 in FIG. 1.

FIGS. 2 and 3 indicate details of the arrangement provided for this purpose in accordance with the present invention. The arrangement is located in the device 10, being concealed as indicated in FIG. 1 when the scribing head 21 is in its rest position. The scribing head of the scriber 20 is movable between the rest position I and the operating or scribing position II (see FIG. 2) and, when it has completed its scribing operation, will return to the rest position I. During such movement the scribing head 21 moves a plurality of adjacent scribing electrodes 22 over the surface of the carrier 15, producing the indicia 16.

Reference numeral 24 in FIGS. 2 and 3 indicates a roller about whose periphery the record carrier 15 is trained, with the roller being rotated in suitable manner to cause the record carrier 15 to advance in the direction of the arrow. Of course, the roller need not be specifically rotated and the carrier 15 could be made to advance by other means. The roller 24 is turnable about an axis A (see FIG. 2) and mounted on this axis is a lever 23 so that it can pivot about the axis A. An electromagnetic device, for instance a solenoid or the like, is designated with reference numeral 25, being connected to a stationary component of the device 10 as well as to one arm of the double-armed lever 23. When energized, the device 25 tends to pivot the lever 23 about the axis A from the rest position I to the scribing position II. Biasing means, here in form of a restoring spring 26 of the contraction type, is also connected with the same arm of the lever 23 and with a fixed component of the device 10, and permanently urges the lever to the rest position I, to which it will cause the lever to return when the device 25 is de-energized.

On the other arm of the lever 23, that is at the other side of the axis A, there is mounted the scribing head 21 which during movement of the lever 23 about the axis A between the positions I and II will perform a movement in an arcuate path, in a pendulum-like manner. Given the direction of movement indicated by the arrow in FIG. 2 for the record carrier 15, it will be appreciated that the scribing head will move in the same direction as the record carrier 15 when it is displaced from the position I to the position II, and will move counter to the direction of advancement of the carrier 15 when it returns to the position I. It is to be understood that in order to prevent distortion of the recorded supplementary items of information, the speed at which the head 21 moves during recording of the supplementary items of information should be at least twice as great as the speed of advancement of the record carrier 15 in the direction of the arrow.

To be able to record the supplementary items of information on the record carrier 15, for instance by burning away portions of the deposited metallic film on the carrier 15, it is necessary that the scribing electrodes 22 carried by the head 21 be in contact with the surface of the carrier 15 during the recording incident. To assure this the illustrated emboidment provides leaf springs 28 which press the electrodes against the surface of the carrier 15 during the recording incident. It will be seen that in the illustrated embodiment the scribing electrodes 22 are arranged in groups or packages 29 of five electrodes each (compared FIG. 3), and each of these groups 29 has associated with it a leaf spring 28 which presses its electrodes into engagement with the surface of the carrier 15. The groups 29 are mounted in a frame 20 of the head 21, laterally adjacent one another, and the electrodes 22 are connected via a ribbon cable 31 (known to those skilled in the art) to a switching unit 32 which is shown in FIG. 3.

Figure 4:
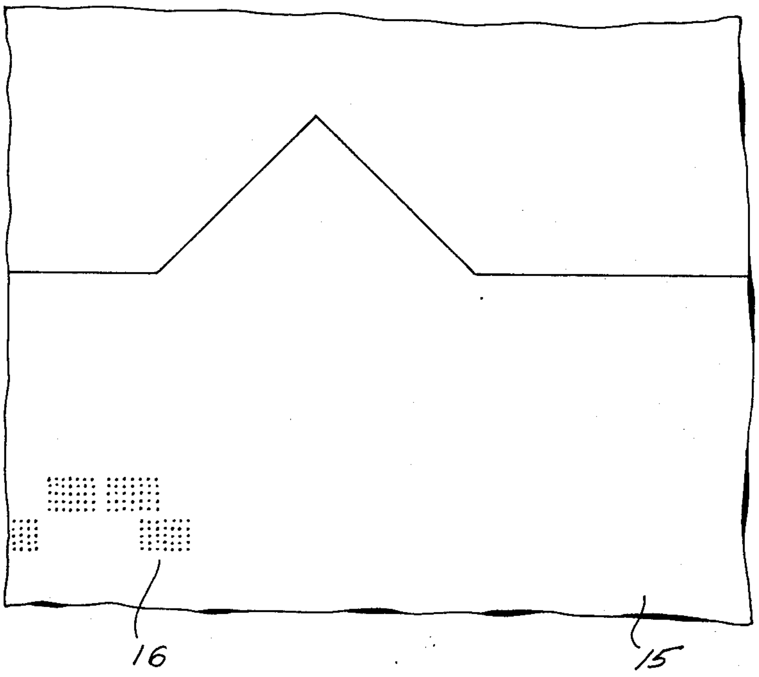
FIG. 4 is a fragmentary plan view illustrating a record carrier with items of main and supplementary information.

Reference numeral 33 designates a signal generating device which generates signals in a sense energizing the electrodes 32 for recording the supplementary items 16 of information, but only when the head 21 moves in a certain direction over the carrier 15. In the illustrated embodiment the electrodes 22 are energized by the signal generator 33 at the same time as the magnetic device 25 is energized, that is when the electrodes 22 produce indicia 16 on the carrier 15 while the head 21 moves from its position I to its position II. All indicia, that is numbers, letters, symbols or the like of a supplementary item of information, which are located in one line with one another (compare the four figures indicated at 16 in FIG. 1), are recorded simultaneously by the electrodes 22. Reference to FIG. 4 shows that each of the indicia of the items of supplementary information 16 is produced on the surface of the carrier 15 —as by burning away portions of a metallic coating thereon— in a 5 × 7 dot (point) grid by a respective electrode group 29.

It is desirable in accordance with the present invention that the switching unit 32 be energizable and de-energizable in dependence upon certain positions assumed by the scribing head 21 as it moves between the positions I and II. The unit 32 controls the beginning and end of the electrical impulses which lead to energization of the electrodes 22. In the illustrated embodiment this is accomplished by providing on the lever 23 a portion 35, for instance a sheet-material tab carried by the lever 23, in which there are produced several slots 34, for instance by punching or the like. These slots 34 are located laterally adjacent one another as is most clearly seen in FIG. 2, and at opposite sides of the major surfaces of the portion 35 there are located a source of electrical energy 36 (e.g. a light bulb) and a photo-electric or light-sensitive detector 37, for instance a photo-transistor. This is shown in FIG. 33 which also indicates the connection of the transistor 37 with the switching unit 32 and the fact that the transistor 37 is accommodated in a casing 38 an opening of which is juxtaposed with the portion 35.

Thus, when the lever 23 with the portion 35 pivots about the axis A, in a sense displacing the scriber head 21 between the positions I and II, light from the soruce 36 can reach the transistor 37 only through the slots 34 in the transistor 37. Any light passing through the respective slots is converted into electrical impulses which are supplied to the unit 32, causing the same to terminate or initiate supply of electrical energy to the electrodes 22 in dependence upon the position of the lever 23 and therefore of the head 21.

It will be understood that the illustrated embodiment is exemplary only and that the present invention should not be considered limited thereto. The scribing head 21 can, for instance, be displaced between its operating and rest positions in a manner other than that illustrated, for instance by permanent magnets, by reversal of the magnets 25 and the restoring spring 26, or in other manner. It is, however, necessary to assure that whatever means is utilized for this purpose, the movement of the head 21 during scribing by the electrodes 22 is faster than the speed of advancement of the carrier 15, to assure that even in the event a disturbance or the like is recorded and results in advancement of the carrier 15 at a higher speed than normally when no such disturbance or the like is being recorded, the secondary or supplementary items 16 of information which are being recorded by the electrodes will be recorded legibly and without blurring.

It will also be appreciated that in place of several electrode groups or packages 29, a single block member may be provided carrying all of the electrodes 22 and be biased in appropriate manner, for instance by being engaged at its opposite ends with respective leaf springs or other springs 28 which urge it towards the carrier 15 in a sense placing the electrodes 22 into engagement therewith.

Similarly it is possible in accordance with the present invention to construct the scriber head 21 in such a manner that the electrodes 22 are located not laterally one another but one above the other. The head can then be transported not in the direction of advancement of the record carrier 15, and opposite thereto, but it can be transported transversely to the direction of advancement, or it can be transported in such a manner as to have a component of movement in or opposite the direction of advancement of the carrier 15 and another component of movement transversely thereto. Here again it is necessary that the speed at which the scriber head 21 advances between its rest and operating positions be greater than the speed of advancement of the record carrier, unless it is desired —and it is conceivable that this might be the case— that the items of supplementary information 16 be recorded slantwise on the carrier 15.

It will be understood that each of the elements described above, or two or more together, may also find a useful application in other types of constructions differing from the types described above.

When the invention has been illustrated and described as embodied in the recording of main items and supplementary items of information on an advancing carrier, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended.

We claim:

1. In a device for recording measured information, in combination, record carrier means having a surface adapted to have recordings produced thereon; advancing means including a rotary roller, mounted for rotation about an axis and having a periphery about which said record carrier is trained, for advancing said record carrier means in a predetermined direction; recording means for recording on said surface of the advancing record carrier means information which is representative of measurements taken; and scribing means adjacent and movable relative to said periphery for scribing onto said surface indicia which are supplementary to said information said scribing means comprising a lever mounted for pivotal movement about the axis of said rotary roller in the directions conforming with and opposite to the direction of advancement of said record carrier means, and a scribing head mounted on said lever for movement therewith.

2. A device according to claim 1, comprising electromagnetic means for displacing said scribing means from a first position to a second position, and restoring spring means for returning said scribing means from said second position to said first position.

3. A device according to claim 2, one of said positions being the rest position and the other the scribing position of the scribing means.

4. A device as defined in claim 2, wherein said electromagnetic means and said restoring spring means are respectively connected with said lever.

5. A device as defined in claim 1, wherein said scribing means comprises a plurality of scribing electrodes.

6. A device as defined in claim 1, wherein said recording means comprises at least one recording electrode; and wherein said scribing means and said recording means are spaced transversely of said direction and located substantially on a common level.

7. A device as defined in claim 1, said scribing means being movable between a rest position and a scribing position.

8. A device as defined in claim 7; further comprising housing means accommodating the previously recited means and having a viewing opening for inspecting said surface and the information and indicia thereon said housing means concealing said scribing means from view at least while in said rest position.

9. A device as defined in claim 1, said lever having two arms, and said scribing head being mounted on one of said arms.

10. A device as defined in claim 1, said lever having two arms, and said scribing head being mounted on one of said arms for movement in an arcuate path between a rest position and a scribing position in response to said pivotal movement of said lever about said axis.

11. A device as defined in claim 1, wherein said advancing means advances said record carrier means at a first speed; and wherein said scribing means includes a scribing head movable to and from a scribing position, and movable to said scribing position with reference to said surface at a second speed which is at least double said first speed.

12. A device as defined in claim 1, said scribing means including a scribing head movable to and from a scribing position and having a plurality of scribing electrodes which in said scribing position engage said surface; and further comprising biasing means biasing said scribing electrodes towards said surface at least when said scribing head is in said scribing position thereof.

13. A device as defined in claim 12, said biasing means including at least one biasing spring.

14. A device as defined in claim 12, said scribing electrodes being arranged in a plurality of discrete groups; and said biasing means comprising a plurality of leaf springs each biasing the electrodes of one of said groups towards said surface.

15. A device as defined in claim 1, said scribing means including a scribing head movable between a rest position and a scribing position and being provided with scribing electrode means; and further comprising signal-generating means electrically connected with said scribing electrode means and operative for supplying signals to the latter only when said scribing head moves from one to the other of said positions, but not when said head moves from said other to said one position.

16. A device as defined in claim 1, said scribing means including a scribing head movable between a rest position and a scribing position and being operative for scribing said indicia while moving to said scribing position.

17. A device as defined in claim 1, said scribing means being operative for simultaneously scribing a plurality of indicia which together constitute a supplementary item of information.

18. A device as defined in claim 1, said scribing measn being operative for scribing the means indicia as dots within a 5 × 7 dot grid.

19. In a device for recording measured information, in combination, record carrier means; means for advancing said record carrier means; means for recording information on said record carrier means; scribing means comprising a scribing head and a double-armed lever carrying said scribing head and being mounted for pivotal movement between two end positions which respectively correspond to a rest position and a scribing position of said scribing head; a source of electrical energy for said scribing means; and control means for initiating and terminating the supply of electrical energy to said scribing means in response to said pivotal movement of said lever.

20. A device according to claim 19, said lever having a lever portion provided with a plurality of laterally adjacent slots; and said control means including a light source at one side of said lever portion and a light-sensitive element at the opposite side thereof for sensing light emanating from said light source when the respective slots are positioned so as to permit passage of light from said light source to said light sensitive element.

* * * * *